H. P. RANKIN.
Meat-Choppers.

No. 140,950. Patented July 15, 1873.

Witnesses:
G. Matthys
Solon C. Kemon

Inventor:
Hugh P. Rankin
Per
Attorneys.

UNITED STATES PATENT OFFICE.

HUGH P. RANKIN, OF ALLEGHENY, PENNSYLVANIA.

IMPROVEMENT IN MEAT-CHOPPERS.

Specification forming part of Letters Patent No. 140,950, dated July 15, 1873; application filed May 28, 1873.

*To all whom it may concern:*

Be it known that I, HUGH P. RANKIN, of Allegheny, in the county of Allegheny and State of Pennsylvania, have invented a new and Improved Meat-Chopper; and I do hereby declare the following to be a full, clear, and exact description of the same, reference being had to the accompanying drawing forming part of this specification.

The invention consists in the improvement of meat-choppers, as hereinafter described and pointed out in the claim.

Figure 1:
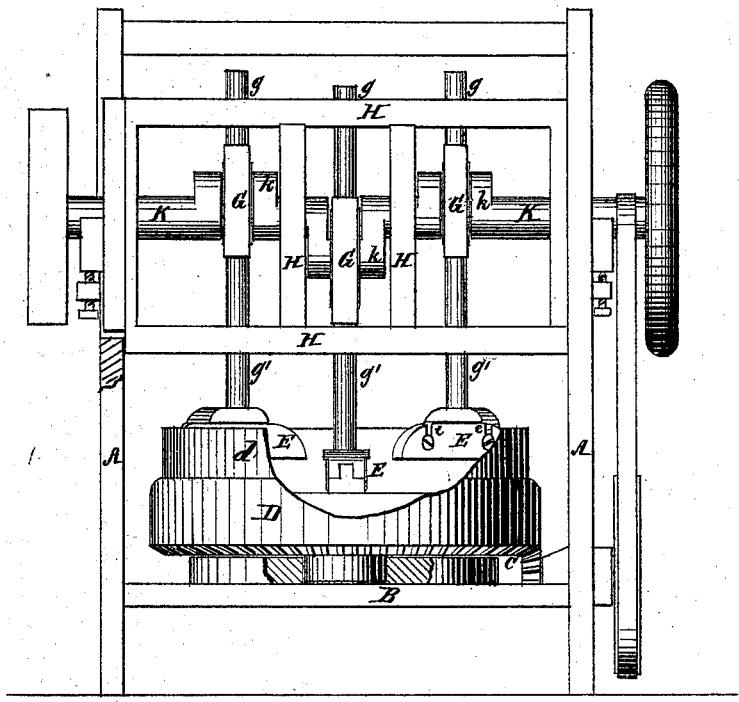
Figure 2:
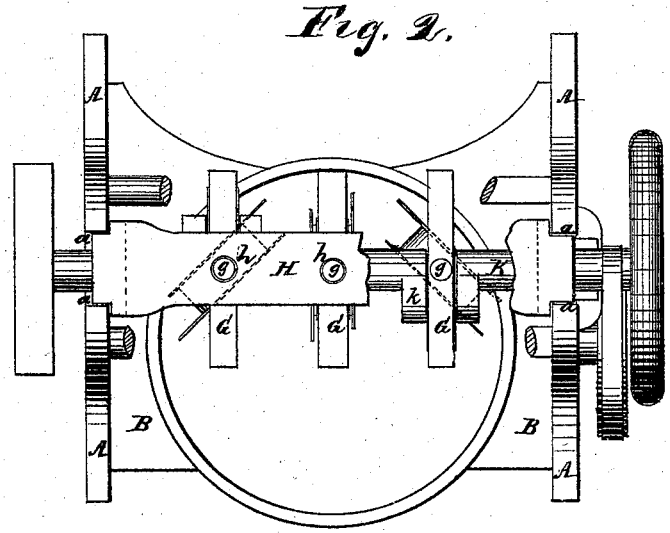
Figure 3:
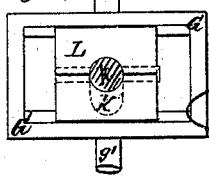

Figure 1 is a front elevation, partly broken out. Fig. 2 is a top view, and Fig. 3 is a detail view, of slide.

In the drawing, A A represent the uprights of frame having vertical slots $a\ a$ opening out at the top, and B B the bottom or bed plate, on which is fastened a centrally-perforated plate, C. In this plate is journaled and revolves a table, D, having the vertical flange $d$. This table is made in the usual manner, of blocks of wood, with the grain in line with the line of movement of the chopping-knives. E E are a series of upwardly and downwardly reciprocating knives, arranged in pairs on each stock, and which are preferably placed at an angle to one another or in different vertical planes so as to cross-cut the line of cut made by each other. These knives are slotted at $e\ e$ so that after being ground they may always be adjusted on the cutter-stocks F, and clamped to bring their edges squarely down upon the table. G is a series of yokes having upper and lower rods $g\ g'$, which slide freely in holes $h$ of guide-frame H. In this frame is journaled a shaft, K, having cranks $k\ k\ k$, which carry slides L. As these slides move back and forward in the yokes G the knives are moved up and down. The drive-shaft K, with the frame H, is held to the bottom of open slots or bearings $a\ a$ only by gravity; and hence if a pair of the knives or one of a pair strikes a bone the shaft and frame rise in the slots $a\ a$, and no damage is done to the machine. Set-screws serve to adjust the extent of the downward movement of the knives with relation to the chopping-table.

Having thus described my invention, what I claim as new, and desire to secure by Letters Patent, is—

The yokes G $g\ g'$ that carry the cutters, combined with a crank-shaft, K, loosely journaled in open slots $a\ a$ of uprights A A to rise whenever a bone or other hard substance is struck by the knives, in the manner described.

H. P. RANKIN.

Witnesses:
 SOLON C. KEMON,
 T. D. DURBIN OURAND.